US009469703B2

(12) United States Patent
Balestra et al.

(10) Patent No.: US 9,469,703 B2
(45) Date of Patent: Oct. 18, 2016

(54) PROCESS FOR THE GAS-PHASE POLYMERIZATION OF OLEFINS

(71) Applicant: Basell Poliolefine Italia S.r.l., Milan (IT)

(72) Inventors: Enrico Balestra, Ferrara (IT); Tiziana Caputo, Ferrara (IT); Maurizio Dorini, Ferrara (IT); Antonio Mazzucco, Ferrara (IT); Silvia Soffritti, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/429,585

(22) PCT Filed: Sep. 5, 2013

(86) PCT No.: PCT/EP2013/068375
§ 371 (c)(1),
(2) Date: Mar. 19, 2015

(87) PCT Pub. No.: WO2014/044544
PCT Pub. Date: Mar. 27, 2014

(65) Prior Publication Data
US 2015/0232588 A1 Aug. 20, 2015

Related U.S. Application Data

(60) Provisional application No. 61/704,176, filed on Sep. 21, 2012.

(30) Foreign Application Priority Data

Sep. 21, 2012 (EP) ..................... 12185323

(51) Int. Cl.
*C08F 2/34* (2006.01)
*C08F 2/01* (2006.01)
*B01J 19/24* (2006.01)
*C08F 10/06* (2006.01)

(52) U.S. Cl.
CPC ................ *C08F 10/06* (2013.01); *B01J 19/24* (2013.01); *B01J 2219/00164* (2013.01); *B01J 2219/24* (2013.01)

(58) Field of Classification Search
CPC ............... C08F 2/01; C08F 2/34; B01J 8/24; B01J 2219/00164; B01J 2219/24
USPC .......................................................... 526/74
See application file for complete search history.

(56) References Cited

U.S. PATENT DOCUMENTS

| 2010/0317811 A1 | 12/2010 | Mazzucco et al. |
| 2012/0172549 A1 | 7/2012 | Mazzucco et al. |
| 2012/0245314 A1 | 9/2012 | Caputo et al. |
| 2013/0165605 A1 | 6/2013 | Soffritti et al. |

FOREIGN PATENT DOCUMENTS

| WO | WO-2009080660 A1 | 7/2009 |
| WO | WO-2011008028 A2 | 1/2011 |
| WO | WO-2011029735 A1 | 3/2011 |
| WO | WO-2012031986 A1 | 3/2012 |

*Primary Examiner* — Fred M Teskin

(57) ABSTRACT

A process and apparatus for producing olefin polymers are disclosed, comprising:
a. polymerizing one or more olefins in the gas phase, in the presence of an olefin polymerization catalyst, whereby growing polymer particles flow along a cylindrically-shaped downward path in densified form under the action of gravity so as to form a densified bed of downward-flowing polymer particles
b. allowing said polymer particles to flow through a restriction of the densified bed, such restriction being positioned in a restriction zone extending from the bed upward to a distance of 15% of the total height of the densified bed; and
c. metering an antistatic agent through a feed line connected to the densified bed at a feed point being located in a feed zone extending from the top of the restriction upward, to a distance five times the diameter of the section of the densified bed above the restriction.

12 Claims, 1 Drawing Sheet

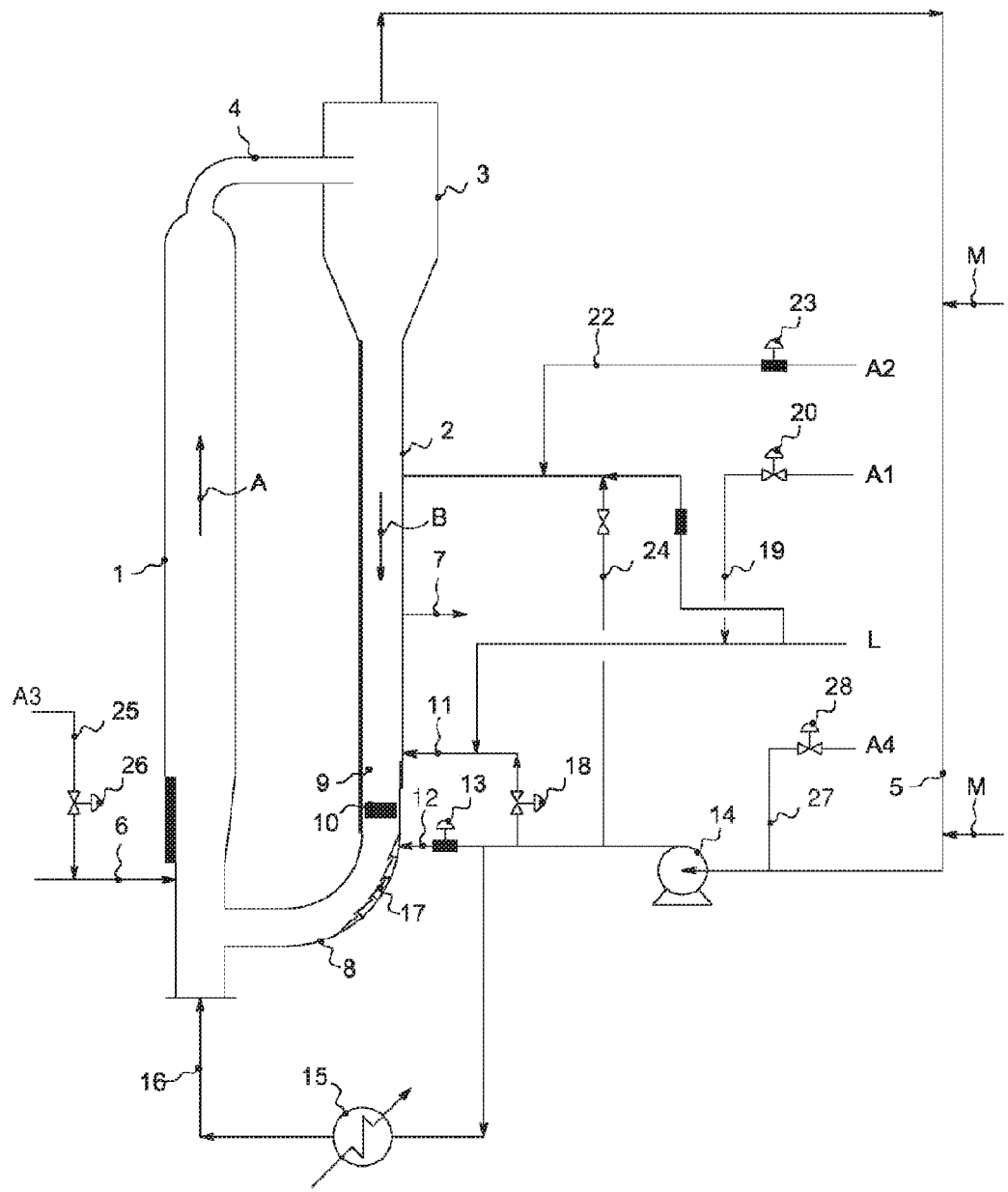

PROCESS FOR THE GAS-PHASE POLYMERIZATION OF OLEFINS

This application is the U.S. National Phase of PCT International Application PCT/EP2013/068375, filed Sep. 5, 2013, claiming benefit of priority to European Patent Application No. 12185323.8, filed Sep. 21, 2012, and benefit of priority under 35 U.S.C. §119(e) of U.S. Provisional Application No. 61/704,176 filed Sep. 21, 2012, the contents of which are incorporated herein by reference in their entirety.

FIELD OF THE INVENTION

The present invention relates to a gas-phase process for the polymerization of olefins carried out in a reactor comprising a zone where the polymer particles flow downward in packed mode so as to form a densified polymer bed. In particular, the present invention is addressed to improving the operability of such reactor by appropriately feeding an antistatic agent.

BACKGROUND OF THE INVENTION

It is known that a relevant problem to be overcome in a gas-phase polymerization process is the formation of polymer agglomerates, which can build up in various places, such as the polymerization reactor and the lines for recycling the gaseous stream. When polymer agglomerates are originated within the polymerization reactor, there can be many adverse effects. For example, the agglomerates can disrupt the removal of polymer from the polymerization reactor by plugging the polymer discharge valves. Further, if the agglomerates fall and cover part of the fluidization grid a loss of fluidization efficiency may occur. This can result in the formation of larger agglomerates which can lead to the shutdown of the reactor.

SUMMARY OF THE INVENTION

It has been found that agglomerates may be also formed as a result of the presence of very fine polymer particles in the polymerization medium. Such fine particles may be present as a result of introducing fine catalyst particles or breakage of the catalyst within the polymerization medium. Those fine particles are believed to deposit onto and electrostatically adhere to the inner walls of the polymerization reactor and the associated equipment for recycling the gaseous stream such as, for example, the heat exchanger. If the fine particles remain active in the absence of heat removal, they will grow in size resulting in the formation of agglomerates, also caused by the partial melting of the polymer itself. Those agglomerates, when formed within the polymerization reactor, tend to be in the form of sheets. Agglomerates can also partially plug the heat exchanger designed to remove the heat of polymerization reaction.

Several solutions have been proposed to solve the problem of formation of agglomerates during a gas-phase polymerization process. Proposed solutions include the deactivation of fine polymer particles, the control of catalyst activity and the reduction of electrostatic charge. EP 359444 describes the introduction into the polymerization reactor of small amounts of an activity retarder in order to keep substantially constant either the polymerization rate or the content of transition metal in the polymer produced. The process is said to produce a polymer without forming agglomerates.

U.S. Pat. No. 4,739,015 describes the use of gaseous-oxygen-containing compounds or of liquid or solid active-hydrogen-containing compounds to prevent the adhesion of the polymer to the inner wall of the polymerization apparatus.

U.S. Pat. No. 4,803,251 describes a process for reducing the polymer sheeting utilizing a group of chemical additives, which generate both positive and negative charges in the reactor, and which are fed to the reactor in an amount of a few parts per million (ppm) with respect to the amount of monomer in order to prevent the formation of undesired positive or negative charges.

EP 560035 discloses a polymerization process in which an anti-fouling compound is used to eliminate or reduce the build-up of polymer particles on the walls of the reactors, or the formation of agglomerates of polymer particles, which may cause the fouling of pipes or other plant components. This anti-fouling compound is preferably selected from alkydiethanolamines, which may be fed at any stage of the gas-phase polymerization process in an amount greater than 100 ppm by weight with respect to the produced (co) polymer. Said anti-fouling compound is capable, when used in a standard polymerization test of ethylene and polypropylene mixture, to selectively inhibit the polymerization on polymer particles smaller than 850 μm, the latter being responsible for fouling problems and polymer sheeting. Other processes for reducing the electrostatic voltage include: (1) installation of grounding devices in the fluidized bed; (2) ionization of gas or particles by electrical discharge to generate ions, which neutralize electrostatic charges onto the particles; (3) the use of radioactive sources to produce radiation capable of generating ions which neutralize electrostatic charges onto the particles.

An innovative gas-phase process for the olefin polymerization, which represents an alternative to the fluidized bed reactor technology, is disclosed in EP 782587 and EP 1012195. The polymerization process is carried out in a gas-phase reactor having interconnected polymerization zones, where the growing polymer particles flow through a first polymerization zone (riser) under fast fluidization or transport conditions, leave said riser and enter a second polymerization zone (downcomer) through which they flow in a densified form under the action of gravity, leave said downcomer and are reintroduced into the riser, thus establishing a circulation of polymer between the two polymerization zones. Also the particular gas-phase technology described in those two patent documents may suffer from the typical drawbacks correlated with the formation of polymer agglomerates, due to the presence of electrostatic charges within the polymerization apparatus. It has in fact been observed tendency to formation of polymer agglomerates, especially in the second polymerization zone (downcomer). In fact, along the downcomer the polymer particles flow downward in a densified form in packed mode, and this condition favors the formation of agglomerates as it is more difficult to remove the polymerization heat due to the limited heat transfer available. The polymer agglomerates can quickly plug the polymer discharge equipment placed at the bottom part of the downcomer.

BRIEF DESCRIPTION OF THE DRAWINGS

FIG. 1 is a diagrammatic representation of the process of the invention.

DETAILED DESCRIPTION OF THE INVENTION

There is therefore a need to improve the operative conditions for feeding an antistatic compound to a gas-phase polymerization process comprising polymer particles flowing downward along the reactor in a densified form, so as to optimize the effect of neutralizing the electrostatic charges in this particular type of gas-phase polymerization reactor.

In WO 2011/029735 there is described an improved arrangement of the feed points of an antistatic compound in such a polymerization process, whereby the antistatic agent is metered by means of several feeding lines placed at different heights of the densified polymer bed. However, there still exist a need to further improve operation of the downcomer, particularly in the production of random copolymers of propylene with ethylene and/or other alpha-olefin comonomers.

It has now been found that the above object can be achieved by appropriately modifying the way of feeding an antistatic compound to the reactor.

Thus, according to a first object, the present invention provides a process for producing olefin polymers, which comprises the steps of:

(a) polymerizing one or more olefins in the gas phase, in the presence of an olefin polymerization catalyst, whereby growing polymer particles flow along a cylindrically shaped downward path in densified form under the action of gravity so as to form a densified bed of downward-flowing polymer particles, such densified bed comprising a bed top and a bed bottom, wherein the distance from the bed bottom to the bed top defines the height of the densified bed;

(b) allowing said polymer particles to flow through a restriction of the densified bed, such restriction being positioned at a distance of abt. 15% of the total height of the densified bed from the bottom of the bed; and (c) metering an antistatic agent through a feed line connected to the densified bed at a feed point being located in a feed zone extending from the top of the restriction, in the direction of the bed top, to a distance five times the diameter of the section of the densified bed above the restriction.

Preferably, the restriction zone extends from the bed bottom to a distance of 10%, more preferably 5%, of the total height of the densified bed.

The feed point of the antistatic is positioned above the restriction, in a feed zone extending from said restriction, in the direction of the bed top, to a distance of preferably 4 times, more preferably 3 times, even more preferably 2 times the diameter of the section of the densified bed above the restriction.

A stream of a gas, also denominated as the "dosing gas", can be fed into the lower part of the densified bed by means of a feed line placed at a short distance above the afore-described restriction. For "short distance" it is intended a distance that is generally up to 1.5 times, preferably comprised between 0.6 and 1.3 times, more preferably between 0.7 and 1.0 times, the diameter of the section of the densified bed above the restriction.

The feed line for metering the antistatic agent and the feed line for metering the dosing gas can suitably be coincident, thus implying the metering of both fluids through a single line.

The process of the present invention advantageously applies to any gas-phase polymerization processes in which the growing polymer particles flow downward into the reactor in a densified form, so that high values of density of the solid inside the reactor are reached, these values approaching the bulk density of the polymer.

The "poured bulk density" of a polymer is a parameter well known to the person skilled in the art: it can be measured according to ASTM D1895/69. The density of solid inside the reactor is defined as mass of polymer per volume of reactor occupied by the polymer.

Specifically, throughout the present specification the term "densified form" of the polymer means that the ratio between the mass of polymer and the reactor volume is higher than 80% of the "poured bulk density" of the obtained polymer. Thus, for instance, in case of a polymer bulk density equal to 420 Kg/m$^3$, a "densified form" of the polymer implies that the polymer mass/reactor volume ratio is of at least 336 kg/m$^3$.

The operating parameters, such as temperature and pressure, are those usually adjusted in a gas-phase catalytic polymerization process: the temperature is generally comprised between 60° C. and 120° C., while the pressure can range from 5 to 50 bar.

The term "antistatic agent" is used in the present description to include the following compounds:
 antistatic substances capable of neutralizing the electrostatic charges of the polymer particles;
 cocatalyst deactivators that partially deactivate the aluminium alkyl co-catalyst, provided that they do not substantially inhibit the overall polymerization activity.

Consequently, an "antistatic agent" according to the invention is any substance that is capable to prevent, eliminate or substantially reduce the formation of build-up of polymer on any equipment of the polymerization plant, including sheeting of reactor walls, or deposits of polymer agglomerates onto any line of the polymerization plant, including the gas recycle line.

According to present invention an antistatic agent is metered into the polymerization process according to a specific arrangement, so as to maximise the anti-static effect of neutralizing the electrostatic charges on the polymer particles flowing downward in a densified form along the polymerization reactor.

According to the present invention, the antistatic agent can be added to the polymerization process neat or diluted in a hydrocarbon solvent, which is useful to improve its dispersion. Suitable hydrocarbon solvents are isopentane, isohexane, n-hexane, cyclohexane, heptane. When a solvent is employed, the amount of antistatic agent in the solution (antistatic+solvent) may range from 2% to 60% by wt, preferably from 4% to 40% by weight.

The antistatic agent is generally added to the polymerization process in a total amount ranging from 5 to 250 ppm weight, based on the weight of polyolefin being produced. Use of lower amounts will be less effective in preventing the polymer buildup, while use of larger amounts will adversely affect the operation of the reactor, more specifically the catalyst activity. Preferred amounts of said antistatic agent are within the range from 10 to 100 ppm weight, based on the weight of polyolefin being produced.

In particular, the process of the present invention can be advantageously applied to the gas-phase polymerization processes described in EP 782587 and EP 1012195, where the polymerization of one or more olefins is carried out in two interconnected polymerization zones. In fact, the polymerization conditions inside the second polymerization zone are such that the polymer particles flow downward in a "densified form" under the action of gravity. Therefore, according to a preferred embodiment of present invention, one or more alpha-olefins are polymerized in a gas-phase reactor having two interconnected polymerization zones, the first polymerization zone, denominated the riser, comprising polymer particles flowing upward under fast fluidization or transport conditions, the second polymerization zone, denominated the downcomer, comprising polymer particles flowing downward in densified form under the action of gravity so as to form a densified polymer bed.

Fast fluidization conditions inside the riser are established by feeding a gas mixture comprising one or more alpha-olefins at a velocity higher than the transport velocity of the polymer particles. The velocity of said gas mixture is generally comprised between 0.5 and 15 m/s, preferably between 0.8 and 5 m/s. The terms "transport velocity" and "fast fluidization conditions" are well known in the art; for a definition thereof, see, for example, "D. Geldart, Gas Fluidisation Technology, page 155 et seq., J. Wiley & Sons Ltd., 1986".

In the downcomer the polymer particles flow under the action of gravity in a densified form, so that the density of the solid inside this polymerization zone approaches the bulk density of the polymer.

According to the present invention it has been observed that feeding an antistatic agent, besides being effective in reducing the formation of polymer sheeting and polymer agglomerates along the entire downcomer, is crucial in keeping the values of the "skin" temperature under control, intended as the temperature measured on the external surface of the reactor by means of suitable apparatuses that are commercially available. High values of such "skin" or wall temperature indicate a stagnant area where the growing polymer can, and generally will, grow into lumps thus jeopardizing the operation of the reactor.

Other additional feed lines of the antistatic agent may be arranged according to the process of the invention. Particularly, in a polymerization reactor having two interconnected polymerization zones said additional feeds of antistatic agent may suitably be arranged along the downcomer, on the line for feeding the catalyst system to the riser and/or along the line that continuously recycles the gas monomers to the polymerization reactor.

The total amount of antistatic agent added to the polymerization reactor suitably ranges from 20 to 500 ppm weight, based on the molecular weight of the polyolefin being produced. Preferred amounts of said antistatic agent are within the range from 50 to 250 ppm weight, again based on the molecular weight of the polyolefin being produced.

The process of the present invention will now be described in detail with reference to the enclosed FIGURE, which has to be considered illustrative and not limitative of the scope of the invention.

FIG. 1 is a diagrammatic representation of the process of the invention when applied to a gas-phase polymerization reactor having two interconnected polymerization zones, as described in EP-B-782587 and EP-B-1012195.

The polymerization reactor shown in FIG. 1 comprises a first polymerization zone 1 (riser), wherein the polymer particles flow upward under fast fluidization conditions along the direction of the arrow A and a second polymerization zone 2 (downcomer), wherein the polymer particles flow downward under the action of gravity along the direction of the arrow B.

The upper portion of the riser 1 is connected to a solid/gas separator 3 by the interconnection section 4. The separator 3 removes most of the unreacted monomers from the polymer particles and the polymer withdrawn from the bottom of separator 3 enters the top portion of the downcomer 2. The separated unreacted monomers, optionally together with polymerization diluents, such as propane, flow up to the top of separator 3 and are successively recycled to the bottom of the riser 1 via the recycle line 5.

A mixture comprising one or more olefin monomers, hydrogen as the molecular weight regulator, propane as the polymerization diluent, is fed to the polymerization reactor via one or more lines M, which are suitably placed along the gas recycle line 5, according to the knowledge of the person skilled in art.

The catalyst components, preferably after a prepolymerization step, are continuously introduced into the riser 1 via line 6. The produced polymer can be discharged from the reactor via a line 7, which is advantageously placed on the lower portion of the downcomer 2: in fact, due to the packed flow of densified polymer, the quantity of gas entrained with the discharged polymer is minimized. By inserting a control valve (not shown in FIG. 1) on the polymer discharge line 7, it becomes possible to continuously control the flow rate of polymer produced by the polymerization reactor. Additional polymer discharge lines with respect to line 7 can conveniently be placed in the bottom part of the downcomer.

The polymerization reactor of present invention further comprises a transport section 8 connecting the bottom of downcomer 2 with the lower region of the riser 1. The bottom of the downcomer 2 converges into a restriction 9. Said restriction 9 is suitably tronco-conically shaped and its walls form a vertical angle in a range of about 5 to 15°, preferably of around 10°. A control valve 10 with an adjustable opening is conveniently placed within or just below said restriction 9. When the control valve 10 is placed below said restriction, the distance between the two is suitably minimized. Also the distance between the control valve 10 and the upper part of the transport section 8 is suitably minimized. The flow rate Fp of polymer continuously circulated between the downcomer 2 and the riser 1 is adjusted by the level of opening of said control valve 10. The control valve 10 may be a mechanical valve, such as a simple or double butterfly valve, a ball valve, etc.

A stream of a gas, also denominated as the "dosing gas", is fed into the lower part of the downcomer 2 by means of a feed line 11 placed at a short distance above said restriction 9. Said line 11 can be conveniently split into multiple lines that can suitably be arranged around a section of the reactor, preferably in an even number (e.g. two, four, six, eight). The dosing gas to be introduced through line 11 is conveniently taken from the recycle line 5. In synthesis, the flow Fp of polymer particles circulated between downcomer 2 and riser 1 is conveniently adjusted by varying the opening of said control valve 10 at the bottom of the downcomer and/or by varying the flow rate of said dosing gas entering the downcomer via line 11. The flow rate of dosing gas is adjusted by means of a control valve 18, which is suitably arranged on line 11.

According to the present invention, an antistatic agent A can be metered into the reactor via feed line 11. A flow rate A1 of such antistatic agent is metered via line 19 by valve 20 and then dispersed into a suitable flow rate of liquid monomer L to obtain a more homogeneous distribution. Such dispersion is then pre-mixed with the dosing gas and thence fed into the downcomer.

As described in International patent application WO 2011/029735, the antistatic agent can additionally be metered to one or more positions along the height of the downcomer via suitable nozzles. In such a case, the antistatic agent flow rate A2 in line 22 is metered by one or more suitable valves 23 and then pre-dispersed either in the liquid monomer L as described above, or alternatively in a fraction of recycle gas taken from recycle line 5 via line 24. Furthermore, as also described in WO 2011/029735, additional flow rates of antistatic agent may be fed into the reactor at the bottom of the riser (flow rate A3, line 25 metered by valve 26) or into the main gas recycle line 5 (flow rate A4, line 27 metered by valve 28).

The transport section 8 is designed as a bend descending from the bottom of downcomer 2 up to the lower region of the riser 1. A carrier gas is introduced via line 12 at the inlet of said transport section 8. The flow rate of the carrier gas is adjusted by means of a control valve 13, which is suitably arranged on line 12.

Also the carrier gas is conveniently taken from the gas recycle line 5. Specifically, the gas recycle stream of line 5 is first subjected to compression by means of a compressor 14 and only a minor percentage of said recycle stream passes through line 12, thus entering the transport section 8 and diluting the solid phase of polymer flowing through the transport section 8. Most of the recycle stream, downstream the compressor 14, is subjected to cooling in a heat exchanger 15 and successively is introduced via line 16 at the bottom of the riser 1 at a high velocity, such to ensure fast fluidization conditions in the polymer bed flowing along the riser 1.

The carrier gas merges with the densified polymer coming from downcomer 2 at the inlet portion of transport section 8, after exiting the slits of the gas distribution grid 17. In the embodiment shown in FIG. 1 the top end of the distribution grid 17 is coincident with the inlet of the transport section 8 and said distribution grid 17 extends along the bending of said transport section 8 for an angle α=60°. The gas distribution grid 17 is formed by a plurality of trays fixed to the transport section 8 in a way to form slits in the overlapping area of adjacent trays. A detailed description of the gas distribution grid 17 can be found in International patent application WO 2012/031986, An additional flow rate of antistatic agent can suitably be metered through line 12.

Depending on the olefin (co)polymer to be produced, the polymerization reactor can be operated by properly adjusting the polymerization conditions and the monomers concentration in the riser and in the downcomer, so as to produce a wide variety of bimodal homopolymers and random copolymers. To this purpose, the gas mixture entraining in the polymer particles and coming from the riser can be partially or totally prevented from entering the downcomer, so as to polymerize two different monomers compositions in the riser and the downcomer. This effect may be achieved by feeding a gaseous and/or a liquid barrier stream through a line placed in the upper portion of the downcomer: said barrier stream should have a suitable composition, different from the gas composition present inside the riser. The flow rate of said barrier stream can be adjusted, so that an upward flow of gas counter-current to the flow of the polymer particles is generated, particularly at the top of the downcomer, thus acting as a barrier to the gas mixture coming from the riser. For further details regarding this barrier effect at the top of the downcomer, reference is made to the disclosure of EP-B-1012195.

In general, all the antistatic agents conventionally known in the art, which are able to prevent, eliminate or substantially reduce the formation of build-up of polymer on any part of the polymerization plant, may be used in the present invention. An overview of antistatic agents suitable for polymerization processes is also given in EP 107127.

The antistatic agent can be selected from one or more of the following classes:

(1) alkyldiethanolammines of formula $R-N(CH_2CH_2OH)_2$ wherein R is an alkyl radical comprised between 10 and 20 carbon atoms, preferably between 12 and 18 carbon atoms;
(2) Polyepoxidate oils, such as epoxidate linseed oil and epoxidate soya oil;
(3) Polyalcohols having from 4 to 8 carbon atoms;
(4) Hydroxyesters with at least two free hydroxyl groups, obtained from carboxylic acids with from 8 to 22 carbon atoms and from polyalcohols;
(5) Amides of formula $R-CONR'R''$, wherein R, R', and R'' may be the same or different and is a saturated or unsaturated hydrocarbon radical having 1 to 22 carbon atoms;
(6) Fatty acid soaps represented by the general formula $R-COOM$, wherein R is a saturated or unsaturated hydrocarbon radical having 12 to 22 carbon atoms, and M is an alkali or alkaline earth metal;
(7) Salts of sulfuric acid esters of higher alcohols represented by the general formula $ROSO_3M$, wherein R is a saturated or unsaturated hydrocarbon radical having 12 to 22 carbon atoms, and M is an alkali or alkaline earth metal;
(8) Salts of sulfuric acid esters of higher secondary alcohols represented by the general formula

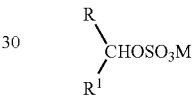

wherein R and R' may be the same or different and are selected from saturated or unsaturated hydrocarbon radical having 12 to 22 carbon atoms, M is an alkali or alkaline earth metal;
(9) Compounds represented by the general formula

wherein R, M and n are the same as above defined;
(10) Salts of (higher alkyl) sulfonic acids represented by the general formula $RSO_3M$ wherein R, M and n are the same as above defined;
(11) Salts of alkylarylsulfonic acids;
(12) Alkali or alkaline earth metal salts of dialkylsulfosuccinic acids;
(13) Alkali or alkaline earth metal salts of partial esters of higher alcohols with phosphoric acid;
(14) Salts of primary amines represented by the general formula

wherein R is a saturated or unsaturated hydrocarbon radical; A is chlorine, bromine;
(15) Compounds of the alkylaminesulfonic acid type represented by the general formula

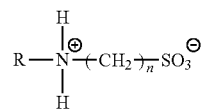

(16) Compounds represented by the general formula

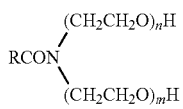

wherein R is a saturated or unsaturated hydrocarbon radical having 4 to 22 carbon atoms; n and m, which may be the same or different, are numbers of from 1 to 10;

Preferred antistatic agents used in the process of the present invention are the compounds belonging to the above classes (1), (2), (3), (4) and (5).

Among the compounds of class (1) particularly preferred antistatic compounds are alkyldiethanolamines, wherein the alkyl group has from 10 to 18 carbon atoms. A preferred compound is a commercial product sold under the trademark ATMER163® (mixture of alkyldiethanolammines of formula R—N(CH$_2$CH$_2$OH)$_2$ where R is an alkyl radical C$_{12}$-C$_{18}$). Among the compounds of class (2) particularly preferred antistatic compound is Edenol D81®. Among the compounds of class (4) particularly preferred is glycerol monostearate (GMS).

The polymerization process of the invention allows the preparation of a large number of polyolefins. Examples of polyolefins that can be obtained are:

high-density polyethylene (HDPE having relative densities higher than 0.940) including ethylene homopolymers and ethylene copolymers with α-olefins having 3 to 12 carbon atoms;

linear polyethylene of low density (LLDPE having relative densities lower than 0.940) and of very low density and ultra low density (VLDPE and ULDPE having relative densities lower than 0.920 down to 0.880) consisting of ethylene copolymers with one or more α-olefins having 3 to 12 carbon atoms;

elastomeric terpolymers of ethylene and propylene with minor proportions of diene or elastomeric copolymers of ethylene and propylene with a content of units derived from ethylene of between about 30 and 70% by weight;

isotactic polypropylene and crystalline copolymers of propylene and ethylene and/or other α-olefins having a content of units derived from propylene of more than 85% by weight;

isotactic copolymers of propylene and α-olefins, such as 1-butene, with an α-olefin content of up to 30% by weight;

impact-resistant propylene polymers obtained by sequential polymerisation of propylene and mixtures of propylene with ethylene containing up to 30% by weight of ethylene;

atactic polypropylene and amorphous copolymers of propylene and ethylene and/or other α-olefins containing more than 70% by weight of units derived from propylene.

The polymerization process of the present invention can be carried out upstream or downstream other conventional polymerization technologies (either in a liquid-phase or a gas-phase), giving rise to a sequential multistage polymerization process. For instance, a fluidised bed reactor can be used to prepare a first polymer component, which is successively fed to the gas-phase reactor of FIG. 1 to prepare a second and a third polymer component. Accordingly, an ethylene polymer endowed with a tri-modal molecular weight distribution can be obtained, as well as a polypropylene blend comprising three components having a different content in ethylene.

The gas-phase polymerization process herewith described is not restricted to the use of any particular family of polymerization catalysts. The invention is useful in any exothermic polymerization reaction employing any catalyst, whether it is supported or unsupported, and regardless of whether it is in pre-polymerized form.

The polymerization reaction can be carried out in the presence of highly active catalytic systems, such as Ziegler-Natta catalysts, single site catalysts, chromium-based catalysts, vanadium-based catalysts.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula Ti(OR)$_n$X$_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are TiCl$_3$, TiCl$_4$, Ti(OBu)$_4$, Ti(OBu)Cl$_3$, Ti(OBu)$_2$Cl$_2$, Ti(OBu)$_3$Cl.

Preferred organometallic compounds are the organo-Al compounds and in particular Al-alkyl compounds. The alkyl-Al compound is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as AlEt$_2$Cl and Al$_2$Et$_3$Cl$_3$ optionally in mixture with said trialkyl aluminum compounds.

Particularly suitable high yield ZN catalysts are those wherein the titanium compound is supported on magnesium halide in active form which is preferably MgCl$_2$ in active form. Particularly for the preparation crystalline polymers of CH$_2$CHR olefins, where R is a C1 C10 hydrocarbon group, internal electron donor compounds can be supported on the MgCl$_2$. Typically, they can be selected among esters, ethers, amines, and ketones. In particular, the use of compounds belonging to 1,3-diethers, cyclic ethers, phthalates, benzoates, acetates and succinates is preferred.

When it is desired to obtain a highly isotactic crystalline polypropylene, it is advisable to use, besides the electron-donor present in the solid catalytic component, an external electron-donor (ED) added to the aluminium alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane.

Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate. The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl.

Other useful catalysts are the vanadium-based catalysts, which comprise the reaction product of a vanadium compound with an aluminum compound, optionally in the presence of a halogenated organic compound. Optionally the vanadium compound can be supported on an inorganic carrier, such as silica, alumina, magnesium chloride. Suitable vanadium compounds are $VCl_4$, $VCl_3$, $VOCl_3$, vanadium acetyl acetonate.

Other useful catalysts are those based on chromium compounds, such as chromium oxide on silica, also known as Phillips catalysts.

Other useful catalysts are single site catalysts, for instance metallocene-based catalyst systems which comprise:
at least a transition metal compound containing at least one π bond;
at least an alumoxane or a compound able to form an alkylmetallocene cation; and optionally an organo-aluminum compound.

A preferred class of metal compounds containing at least one π bond are metallocene compounds belonging to the following formula (I):

$$Cp(L)_qAMX_p \qquad (I)$$

wherein M is a transition metal belonging to group 4, 5 or to the lanthanide or actinide groups of the Periodic Table of the Elements; preferably M is zirconium, titanium or hafnium;
the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, -Me, -Et, -n-Bu, -sec-Bu, -Ph, -Bz, —CH$_2$SiMe$_3$, -OEt, —OPr, —OBu, —OBz and —NMe$_2$;
p is an integer equal to the oxidation state of the metal M minus 2;
n is 0 or 1; when n is 0 the bridge L is not present;
L is a divalent hydrocarbon moiety containing from 1 to 40 carbon atoms, optionally containing up to 5 silicon atoms, bridging Cp and A, preferably L is a divalent group $(ZR^7_2)_n$;
Z being C, Si, and the $R^7$ groups, equal to or different from each other, being hydrogen or a hydrocarbon radical containing from 1 to 40 carbon atoms;
more preferably L is selected from Si(CH$_3$)$_2$, SiPh$_2$, SiPhMe, SiMe(SiMe$_3$), CH$_2$, (CH$_2$)$_2$, (CH$_2$)$_3$ or C(CH$_3$)$_2$;
Cp is a substituted or unsubstituted cyclopentadienyl group, optionally condensed to one or more substituted or unsubstituted, saturated, unsaturated or aromatic rings;
A has the same meaning of Cp or it is a $NR^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

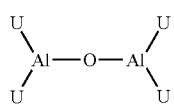

wherein the substituents U, same or different, are defined above.

In particular, alumoxanes of the formula:

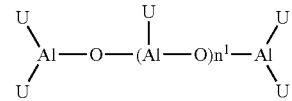

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

can be used in the case of cyclic compounds, wherein $n^2$ is an integer from 2 to 40 and the U substituents are defined as above.

The catalyst may suitably be employed in the form of a pre-polymer powder prepared beforehand during a pre-polymerization stage with the aid of a catalyst as described above. The pre-polymerization may be carried out by any suitable process, for example, polymerization in a liquid hydrocarbon diluent or in the gas phase using a batch process, a semi-continuous process or a continuous process.

According to another object, the present invention provides an apparatus for the polymerization of olefins in the gas phase, which comprises a gas-phase polymerization reactor having interconnected polymerization zones, the reactor being composed of a riser (1) through which the polymer particles flow upwards under fast fluidization or transport conditions, and a downcomer (2) through which the polymer particles flow downward in a densified form under the action of gravity; such reactor being provided with:
(i) a restriction (9) positioned in the lower part of the downcomer in a restriction zone extending from the bottom of the downcomer upward to a distance of 15% of the portion of the downcomer occupied by a densified bed of polymer particles, and
(ii) a feed line (11) connected to the downcomer at a feed point being located in a feed zone extending from the top of the restriction upward to a distance five times the diameter of the section of the downcomer above the restriction, such feed line (11) being connected to an antistatic agent feed line (19).

The apparatus can comprise one or more other feed lines (22) for metering the antistatic agent to additional positions along the height of the downcomer.

The following examples will further illustrate the present invention without limiting its scope

EXAMPLES

Methods

The characterization data for the propylene polymers were obtained according to the following methods:

Melt flow rate (MFR)—determined according to ISO 1133 (230° C., 2.16 Kg).

Ethylene content—determined by IR spectroscopy

Xylene Solubles (XS)—determined as follows: 2.5 g of polymer and 250 ml of xylene are introduced in a glass flask equipped with a refrigerator and a magnetical stirrer. The temperature is raised in 30 minutes up to the boiling point of the solvent. The clear solution so obtained is then kept under reflux and stirring for further 30 minutes. The closed flask is then kept in thermostatic water bath at 25° C. for 30 minutes. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Example 1

The process of the invention was carried out under continuous conditions in a plant comprising a gas-phase polymerization reactor having interconnected polymerization zones, as shown in FIG. 1.

A Ziegler-Natta catalyst was used as the polymerization catalyst comprising:
- a titanium solid catalyst component prepared with the procedure described in EP 728 769, Example 5, lines 46 to 53, according to which di-isobutyl phthalate is used as an internal donor compound;
- triethylaluminium (TEAL) as a cocatalyst;
- dicyclopentyldimethoxysilane as an external donor.

The above catalyst components were pre-contacted in a pre-activation vessel at a temperature of 15° C. for 10 minutes with a weight ratio TEAL/(solid catalyst component) of 4 and a weight ratio TEAL/(external donor) of 4.

The thus activated catalyst was fed to the gas-phase polymerization reactor, where propylene was polymerized with ethylene using $H_2$ as molecular weight regulator and propane as an inert polymerization diluent. The polymerization was carried out at a temperature of 75° C. and at a pressure of 28 bar. Plant capacity was 19.3 t/h.

An antistatic agent (ATMER 163®) was metered into the reactor at several locations at a ratio of 130 ppm per kg/h of polymer produced. With reference to FIG. 1, about 32% of the antistatic agent was metered into the lower part of the downcomer via line 11 (flow A1), while the remainder 68% was metered via lines 22, 25 and 27 (flows A2, A3 and A4).

This configuration of the antistatic feed ensured a very stable operation of the plant for the duration of the trial, as evidenced by the absence of problems at the reactor discharge, and as highlighted by stable and normal values of the temperatures detected on the outside reactor walls at the bottom of the downcomer, ranging from 91.8 to 96° C.

The obtained polymer had MFR of 10.5 g/10', ethylene comonomer content of 3.2% and Xylene Solubles of 5.5%.

Example 2

Comparative

The operation according to example 1 was continued with the only change that the antistatic flow rate A1 metered through line 11 was stopped and redirected to the other streams A2, A3 and A4 so that 100% of the antistatic was metered via lines 22, 25 and 27. This had a sudden and unwanted effect on the skin temperatures of the downcomer which in a few minutes increased abruptly to 107.1° C. Most importantly, this was followed in a short time by the pluggage of the reactor discharges and the eventual shutdown.

The invention claimed is:

1. A process for producing olefin polymers, which comprises the steps of:
   a) polymerizing one or more olefins in the gas phase, in the presence of an olefin polymerization catalyst, whereby growing polymer particles flow along a cylindrically-shaped downward path in densified form under the action of gravity so as to form a densified bed of downward-flowing polymer particles;
   b) allowing said polymer particles to flow through a restriction of the densified bed, such restriction being positioned in a restriction zone extending from the bed bottom upward to a distance of 15% of the total height of the densified bed; and
   c) metering an antistatic agent through a feed line connected to the densified bed at a feed point being located in a feed zone extending from the top of the restriction upward, to a distance five times the diameter of the section of the densified bed above the restriction.

2. The process according to claim 1, wherein the restriction of the bed is positioned in a zone extending from the bed bottom upward to a distance of 10% of the total height of the densified bed.

3. The process according to claim 1, wherein the feed point line for metering the antistatic agent is located above the restriction, in a feed zone extending from said upward to a distance to of 4 times the diameter of the section of the densified bed immediately above the restriction.

4. The process according to claim 1, wherein a stream of a dosing gas is fed into the lower part of the densified bed by means of a feed line placed at a distance above the restriction of up to 1.5 times the diameter of the section of the densified bed immediately above the restriction.

5. The process according to claim 4, wherein the feed line for metering the antistatic agent and the feed line for metering the dosing gas are coincident.

6. The process according to claim 1, wherein the restriction of the bed is positioned in a zone extending from the bed bottom upward to a distance of 5% of the total height of the densified bed.

7. The process according to claim 1, wherein the feed point line for metering the antistatic agent is located in a feed zone extending from said upward to a distance to of more preferably 3 times the diameter of the section of the densified bed immediately above the restriction.

8. The process according to claim 1, wherein the feed point line for metering the antistatic agent is located in a feed zone extending from said upward to a distance to of 2 times the diameter of the section of the densified bed immediately above the restriction.

9. The process according to claim 1, wherein a stream of a dosing gas is fed into the lower part of the densified bed by means of a feed line placed at a distance above the restriction of between 0.6 and 1.3 times the diameter of the section of the densified bed immediately above the restriction.

10. The process according to claim 1, wherein a stream of a dosing gas is fed into the lower part of the densified bed by means of a feed line placed at a distance above the restriction of between 0.7 and 1.0 times the diameter of the section of the densified bed immediately above the restriction.

11. An apparatus for the polymerization of olefins in the gas phase in the presence of an antistatic agent, which comprises a gas-phase polymerization reactor having interconnected polymerization zones, the reactor comprising a riser (1) through which the polymer particles flow upwards under fast fluidization or transport conditions and a downcomer (2) through which the polymer particles flow downward in a densified form under the action of gravity, the reactor being provided with:
   a) a restriction (9) positioned in the lower part of the downcomer in a restriction zone extending from the bottom of the downcomer upward to a distance of 15% of the portion of the downcomer occupied by a densified bed of polymer particles, and
   b) with a feed line (11) connected to the downcomer at a feed point being located in a feed zone extending from the top of the restriction upward to a distance five times the diameter of the section of the downcomer above the restriction, such feed line (11) being connected to an antistatic agent feed line (19) that is in fluid communication with an antistatic agent source.

12. The apparatus according to claim 11, comprising one or more other feed lines (22) for metering the antistatic agent to additional positions along the height of the downcomer.

\* \* \* \* \*